US009989429B2

(12) United States Patent
Matysik et al.

(10) Patent No.: US 9,989,429 B2
(45) Date of Patent: Jun. 5, 2018

(54) ARRANGEMENT FOR MEASURING A FORCE OR A TORQUE ON A MACHINE ELEMENT

(71) Applicant: Schaeffler Technologies AG & Co. KG, Herzogenaurach (DE)

(72) Inventors: Jan Matysik, Nuremberg (DE); Christian Mock, Schweinfurt (DE); Stephan Neuschaefer-Rube, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 29 days.

(21) Appl. No.: 15/108,688

(22) PCT Filed: Dec. 18, 2014

(86) PCT No.: PCT/DE2014/200724
§ 371 (c)(1),
(2) Date: Jun. 28, 2016

(87) PCT Pub. No.: WO2015/106753
PCT Pub. Date: Jul. 23, 2015

(65) Prior Publication Data
US 2016/0327443 A1      Nov. 10, 2016

(30) Foreign Application Priority Data

Jan. 14, 2014  (DE) .................. 10 2014 200 461

(51) Int. Cl.
*G01L 3/00* (2006.01)
*G01L 3/10* (2006.01)
(Continued)

(52) U.S. Cl.
CPC .............. *G01L 3/103* (2013.01); *G01L 1/125* (2013.01); *G01L 3/102* (2013.01); *G01L 3/104* (2013.01);
(Continued)

(58) Field of Classification Search
CPC .......... G01L 3/102–3/105; G01L 1/125; G01L 25/003; G01L 5/0061
(Continued)

(56) References Cited

U.S. PATENT DOCUMENTS 4,503,714 A  *  3/1985  Winterhoff ............. G01L 3/102
                                                          324/209
5,052,232 A  *  10/1991  Garshelis ............... G01L 3/102
                                                          73/862.336
(Continued)

FOREIGN PATENT DOCUMENTS

CA        2381075       1/2002
DE        69222588      5/1998
(Continued)

*Primary Examiner* — Jonathan Dunlap
(74) *Attorney, Agent, or Firm* — Volpe & Koenig, P.C.

(57) ABSTRACT

The present invention relates to an arrangement for measuring a force and/or a torque on a machine element extending in an axis, using the inverse magnetostrictive effect. The machine element has at least one permanent magnetization. The permanent magnetization extends along a closed magnetization path. The magnetization path runs preferably at least partially along the surface of the machine element. The arrangement further includes at least one magnetic field sensor which is arranged opposite the machine element. The magnetic field sensor serves to determine a magnetic field and is designed to measure at least one vector component of a magnetic field coming from the machine element, which field is produced on the one hand by the permanent magnetization and on the other hand by the force and/or by the
(Continued)

torque. According to the invention, the orientation of the permanent magnetization relative to the axis changes along the magnetization path.

20 Claims, 5 Drawing Sheets

(51) Int. Cl.
   *G01L 1/12* (2006.01)
   *G01L 5/00* (2006.01)
   *G01L 25/00* (2006.01)

(52) U.S. Cl.
   CPC ............ *G01L 3/105* (2013.01); *G01L 5/0061* (2013.01); *G01L 25/003* (2013.01)

(58) Field of Classification Search
   USPC ..................................... 73/862.331–862.336
   See application file for complete search history.

(56) References Cited

U.S. PATENT DOCUMENTS

| | | | |
|---|---|---|---|
| 5,298,689 A | 3/1994 | Mohri et al. | |
| 5,321,985 A * | 6/1994 | Kashiwagi | G01L 3/102 324/209 |
| 5,351,555 A | 10/1994 | Garshelis | |
| 5,850,045 A * | 12/1998 | Harada | G01L 3/102 73/779 |
| 6,047,605 A | 4/2000 | Garshelis | |
| 6,581,480 B1 | 6/2003 | May et al. | |
| 6,776,057 B1 | 8/2004 | May | |
| 6,810,754 B2 | 11/2004 | May | |
| 7,028,545 B2 | 4/2006 | Gandel et al. | |
| 7,140,258 B2 | 11/2006 | May | |
| 7,219,564 B1 | 5/2007 | May | |
| 7,363,827 B2 | 4/2008 | Hedayat et al. | |
| 7,631,564 B1 * | 12/2009 | Sihler | G01L 3/102 73/862.333 |
| 7,752,923 B2 * | 7/2010 | Shimizu | G01L 3/102 73/862.325 |
| 8,106,652 B2 * | 1/2012 | May | G01D 5/145 324/244 |
| 8,191,431 B2 * | 6/2012 | Hedayat | G01L 3/102 73/862.331 |
| 8,191,432 B2 | 6/2012 | Hayakawa et al. | |
| 2003/0115972 A1 * | 6/2003 | May | G01L 3/102 73/862.333 |
| 2003/0150282 A1 | 8/2003 | May | |
| 2007/0022809 A1 * | 2/2007 | Yoshida | G01L 3/102 73/200 |
| 2009/0301223 A1 * | 12/2009 | Sihler | G01L 3/102 73/862.333 |
| 2012/0041691 A1 * | 2/2012 | Fericean | G01D 5/202 702/41 |
| 2015/0204740 A1 * | 7/2015 | Fericean | G01D 5/202 73/862.331 |
| 2016/0025579 A1 * | 1/2016 | Matysik | B05D 7/14 73/862.335 |

FOREIGN PATENT DOCUMENTS

| | | |
|---|---|---|
| DE | 69132101 | 9/2000 |
| DE | 60007641 | 11/2004 |
| DE | 60008543 | 12/2004 |
| DE | 60200499 | 5/2005 |
| DE | 60105794 | 2/2006 |
| DE | 60309678 | 9/2007 |
| DE | 69936138 | 2/2008 |
| DE | 69838904 | 1/2009 |
| EP | 0270122 | 6/1988 |
| WO | 0127638 | 4/2001 |
| WO | 2006053244 | 5/2006 |
| WO | 2007006552 | 1/2007 |
| WO | 2007048143 | 4/2007 |
| WO | 2011085400 | 7/2011 |

* cited by examiner

ARRANGEMENT FOR MEASURING A FORCE OR A TORQUE ON A MACHINE ELEMENT

BACKGROUND

The present invention relates to an arrangement for measuring a force and/or a torque on a machine element extending along an axis using the inverse magnetostrictive effect.

From DE 600 08 543 T2, a converter element is known that is provided for use in a torque or force sensor. The converter element is provided integrally in a shaft made from magnetizable material and has a magnetization oriented in an axial direction.

DE 600 07 641 T2 shows a converter element that is provided for a torque or force sensor converter. In this converter element, magnetizations are formed in a radially inner region and in a radially outer region.

From DE 603 09 678 T2, a method for detecting a torque in a shaft is known in which magnetic fields with alternating polarity are generated and measured with a sensor arrangement.

DE 601 05 794 T2 shows a force-sensitive converter element with a body made from magnetic material, wherein at least two magnetized areas are formed in the body, with these areas extending at an angle to the force transmission direction and having opposing magnetization polarities.

DE 699 36 138 T2 shows a magnetic force sensor in which a magnetized material is exposed to a bending moment, wherein the external magnetic field of the magnetized material can be determined with the help of a sensor arrangement.

WO 2011/085400 A1 shows a magnetoelastic force sensor with which mechanical loads of an element can be measured. The element has a tangential, circumferential magnetization and is loaded with a bending moment. On a center plane there is a magnetic field sensor.

DE 602 00 499 T2 shows a position sensor with a magnetic structure with two ferromagnetic collars.

From DE 692 22 588 T2, an annular magnetized torque sensor is known.

DE 691 32 101 T2 shows a magnetic image sensor with a wire that has a magnetization in the circumferential direction.

From DE 698 38 904 T2, a torque sensor with circular magnetization is known.

WO 2007/048143 A2 teaches a sensor with a magnetized shaft.

WO 01/27638 A1 shows an oscillation sensor with a shaft that is magnetized circumferentially or longitudinally.

From WO 2006/053244 A2 a torque sensor is known that comprises a magnetization of a rotating shaft. The magnetization has a circumferential construction.

U.S. Pat. No. 8,191,432 B2 shows a sensor with a magnetized shaft in which at least two magnetically active areas extend axially.

SUMMARY

Starting from the prior art, the objective of the present invention consists in expanding the options for measuring forces and torques on machine elements using the inverse magnetostrictive effect.

This specified objective is achieved by an arrangement according to the invention.

The arrangement according to the invention is used for measuring a force and/or a torque on a machine element extending along an axis. The force or the torque acts on the machine element, which produces mechanical stress and usually slightly deforms the machine element. The machine element has at least one permanent magnetization. The permanent magnetization extends along a closed magnetization path. The magnetization path runs in the material of the machine element. In one area around the magnetization path, the material of the machine element is permanently magnetized. Outside of this area, the machine element is preferably not magnetized. The magnetization path runs preferably at least partially along a surface of the machine element, so that the permanent magnetization extends preferably at least partially on the surface of the machine element.

The arrangement further comprises at least one magnetic field sensor that is arranged opposite the machine element. The magnetic field sensor is used for determining a magnetic field and is constructed for measuring at least one vector component of a magnetic field that extends out from the machine element and is caused, on one hand, by the permanent magnetization and, on the other hand, by the force and/or by the torque. With the help of the at least one magnetic field sensor it is also possible to measure the magnetic field that is produced due to the inverse magnetostrictive effect based on the permanent magnetization and due to the force acting on the machine element or the torque acting on the machine element.

According to the invention, the orientation of the permanent magnetization relative to the axis changes along the magnetization path. Thus, the orientation of the magnetization path also changes along its extent with respect to the axis. Sections of the magnetization path are thus present that have different orientations with respect to the axis. In contrast to the prior art, wherein the permanent magnetization is oriented basically axially, basically inclined to the axis, or basically circumferentially, the permanent magnetization of the arrangement according to the invention has different orientations relative to the axis along its extent. The closed magnetization path can run, for example, completely on the surface in a circumferential section of the machine element. By changing the orientation, the magnetization path can be closed within the circumferential section. In each case, the magnetization path does not run completely along an extent of the machine element, for which it does not have to change its orientation relative to the axis. Through the freely selectable orientation of the magnetization path according to the invention, any shapes within the machine element can be selected for the magnetization path as long as the magnetization path is closed. In particular, the magnetization path can have different orientations with respect to the axis over an extent of the machine element.

One special advantage of the arrangement according to the invention consists in that the machine element can have permanent magnetizations oriented in particular ways, wherein interfering effects from, e.g., external magnetic fields can be reduced and loads of the machine element can be measured individually by special forces and torques. In particular, the machine element can have several of the permanent magnetizations, so that forces and/or torques can be measured at different positions of the machine element.

In preferred embodiments of the arrangement according to the invention, the permanent magnetization is magnetically neutral outside of the machine element in a state of the machine element in which the machine element is unloaded by the force and/or by the torque. Consequently, the machine element is magnetically neutral to the outside when it is not loaded by a force or a torque and has no mechanical stress.

Then it has no technically usable magnetic field that can be measured outside of the machine element.

In preferred embodiments of the arrangement according to the invention, the permanent magnetization is in an energetic equilibrium in a state of the machine element in which the machine element is unloaded by the force and/or by the torque. Consequently, the magnetic polarization in the material of the machine element is in an energetic equilibrium in the unloaded state.

The machine element preferably forms an integral component of the arrangement.

The permanent magnetization is preferably formed by a magnetized three-dimensional sub-area of the volume of the machine element, which has the shape of a closed cord, wherein the magnetization path represents a center axis of the cord. The cord preferably has a circular or a square cross section. The cross section can also be flattened, for example, in the form of a flattened superellipse or a flat rectangle. Preferably, the cross section of the cord does not change along the extent of the cord. However, the cross section of the cord along the extent of the cord can also be variable.

The magnetization path is preferably formed by a three-dimensional curve that is closed in space. This curve runs in the machine element, in particular, through the material of the machine element. The curve can basically have any shape, in particular, the curve could also have an irregular shape.

The magnetization path or the three-dimensional curve is preferably axis-symmetric. The magnetization path or the three-dimensional curve thus preferably has at least one axis of symmetry.

The axis of the machine element is preferably arranged outside of the closed magnetization path or outside of the closed curve. Thus, the magnetization path cannot be closed along an extent of the machine element as is known from the prior art.

The magnetization path or the three-dimensional curve can also extend circumferentially around a recess in the machine element. The recess can be, for example, a hole that is arranged radially in the machine element.

In a first group of preferred embodiments, the magnetization path or the three-dimensional curve runs completely along a surface of the machine element. Consequently, the machine element is magnetized only on one part of its surface. The magnetization path thus represents a closed curve on the surface of the machine element.

The magnetization path or the three-dimensional curve preferably has the shape of a polygon or a superellipse, wherein the polygon or the superellipse is projected onto the surface of the machine element. The polygon or the superellipse is preferably projected onto a circumferential section of the surface of the machine element.

The magnetization path or the three-dimensional curve preferably has the shape of a parallelogram or a superellipse, wherein the parallelogram or the superellipse is projected onto the surface of the machine element. The parallelogram or the superellipse is preferably projected onto a circumferential section of the surface of the machine element.

The parallelogram is preferably formed by a rectangle. The sides of the rectangle can be arranged orthogonal or parallel relative to the axis of the machine element. In this case, two of the four sides of the rectangle are oriented orthogonal relative to the axis, while the two other of the four sides of the rectangle are oriented parallel relative to the axis of the machine element. The permanent magnetization thus changes its orientation relative to the axis along the magnetization path from tangential to parallel and vice versa.

In alternative, preferred embodiments, sides of the parallelogram or the sides of the parallelogram formed as a rectangle are inclined relative to the axis. Different inclination angles can be realized.

The axes of the superellipse can be arranged orthogonal or parallel relative to the axis of the machine element. Alternatively, the axes of the superellipse can also be inclined relative to the axis.

The superellipse is preferably formed by an ellipse. The ellipse is preferably formed by a circle. Alternatively, the superellipse is preferably formed as an oval.

In a second group of preferred embodiments, the magnetization path or the three-dimensional curve runs only partially along a surface of the machine element. The other part of the magnetization path or the three-dimensional curve thus runs farther inward in the machine element under the surface of the machine element. In this group of preferred embodiments, the magnetization path preferably extends in a plane. A perpendicular from a center point of a surface spanned by the magnetization path onto the axis of the machine element lies in the specified plane. The center point can be a geometric center point or else also a center of gravity of the surface spanned by the magnetization path. In this second group of preferred embodiments, the axis of symmetry of the preferably given axis symmetry of the magnetization path is preferably parallel or perpendicular to the axis of the machine element, wherein this axis of symmetry can also be arranged at an angle relative to the axis. The axis-symmetrical magnetization path preferably has two longitudinal sides, wherein one of the two longitudinal sides is arranged on the surface of the machine element, while the other of the two longitudinal asides is arranged under the surface of the machine element, preferably under the longitudinal side arranged on the surface.

For preferred embodiments, the machine element has multiple permanent magnetizations. The multiple permanent magnetizations preferably have identical constructions. The multiple permanent magnetizations are also preferably oriented relative to the axis in the same way. The multiple permanent magnetizations can be arranged at a distance to each other or adjacent to each other. The polarity of the multiple permanent magnetizations preferably alternates between adjacent permanent magnetizations. The multiple permanent magnetizations can also have different constructions in order to be able to simultaneously measure different components of the magnetic field caused by the permanent magnetization and by the force and/or by the torque.

The component having the permanent magnetization is connected at least rigidly to the machine element or to a main component of the machine element, wherein the permanent magnetization is exposed to the mechanical stress on the machine element together with the machine element. The permanent magnetization is preferably constructed integrally with the machine element or with a main component of the machine element. In each case these are not additional permanent magnets that are mounted, for example, externally on the machine element and are not exposed to the mechanical stress on the machine element. The permanent magnetization is preferably formed in a magnetoelastic section of the machine element. In the magnetoelastic section of the machine element, the machine element preferably is formed of a magnetostrictive material. Preferably, not only a section, but the machine element itself has a magnetoelastic construction. In this case, the machine element is formed of a magnetostrictive material.

In preferred embodiments, the arrangement comprises multiple magnetic field sensors.

The one or more magnetic field sensors are preferably arranged at a distance from the axis.

The one or more magnetic field sensors are preferably fixed in place and arranged at a distance to the machine element. While the force or the torque can cause movements or deformation of the machine element, the magnetic field sensors do not change their fixed position.

The magnetic field sensor is preferably constructed for measuring exactly one vector component of the magnetic field emerging from the machine element, which is caused, on one hand, by the permanent magnetization and, on the other hand, by the force and/or by the torque. Thus, the magnetic field sensor is constructed for determining a single load type and is not sensitive relative to the other load types.

The machine element preferably has the shape of a prism or a cylinder, wherein the prism or the cylinder is arranged coaxial to the axis. The prism or the cylinder is preferably straight. In an especially preferred way, the machine element has the shape of a straight circular cylinder, wherein the circular cylinder is arranged coaxial to the axis. In special embodiments, the prism or the cylinder has a conical construction.

The machine element is preferably formed by a shaft or a flange. The shaft or the flange can be designed for loads due to different forces and torques.

The machine element preferably has a hollow space through which the axis runs at least in some sections. Consequently, the hollow space encloses at least one section of the axis. The hollow space preferably extends in the axis.

The hollow space preferably has a cylindrical shape, wherein the cylindrical shape is arranged coaxial to the axis. The machine element can be formed, for example, by a hollow shaft.

The one or more magnetic field sensors are preferably arranged in the hollow space of the machine element. The one or more magnetic field sensors are alternatively arranged preferably outside of the hollow space.

The one or more magnetic field sensors are preferably formed by Hall sensors, coils, or flux gate magnetometers. In principle, other sensor types could also be used if they are suitable for measuring the magnetic fields generated by the inverse magnetostrictive effect.

BRIEF DESCRIPTION OF THE DRAWINGS

Other advantages, details, and refinements of the invention are produced from the following description of preferred embodiments with reference to the drawing. Shown are.

DETAILED DESCRIPTION OF THE PREFERRED EMBODIMENTS

Figure 1:
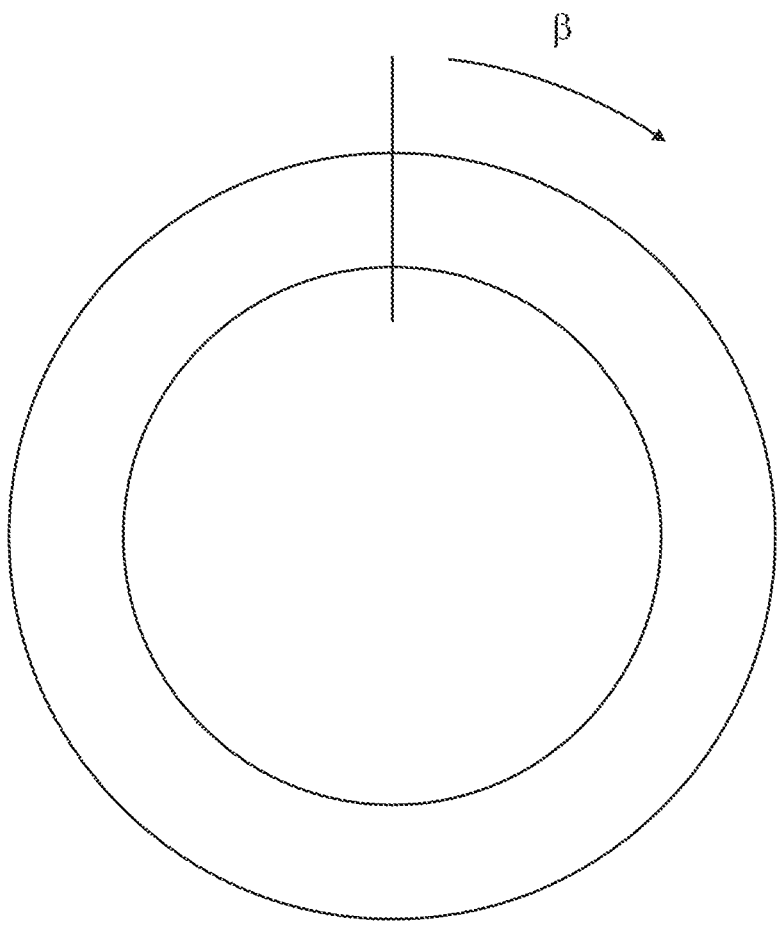
FIG. 1: a machine element of a preferred embodiment of the arrangement according to the invention in a cross-sectional view.

FIG. 1 shows a machine element of a preferred embodiment of the arrangement according to the invention in a cross-sectional view. This machine element involves a hollow shaft made from a magnetostrictive material. The hollow shaft can be exposed to different forces and torques, which are to be measured with the help of the arrangement according to the invention. The arrangement according to the invention further comprises a magnetic field sensor (not shown) that is arranged at a distance to the hollow shaft in the vicinity of the hollow shaft.

The hollow shaft is partially magnetized by a permanent magnetization. The permanent magnetization is formed along a magnetization path 01 (shown in FIG. 2 to FIG. 13).

In FIG. 1, an angle $\beta$ is shown. FIG. 2 to FIG. 13 include representations of the hollow shaft with reference to the angle $\beta$. FIG. 2 to FIG. 11 show a cylindrical lateral-face-shaped surface 02 of different embodiments of the hollow shaft, wherein the cylindrical lateral-face-shaped surface 02 is represented by an unrolling of the hollow shaft over the angle $\beta$. Accordingly, the cylindrical lateral-face-shaped surface 02 of the hollow shaft is shown as a rectangle.

Figure 2:
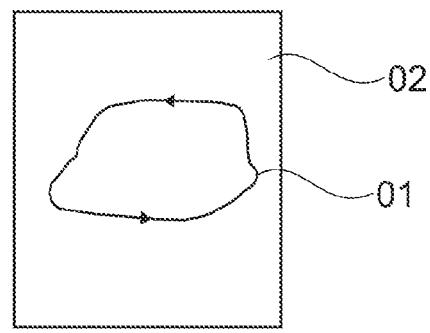
FIG. 2: a magnetization path of an arrangement according to the invention.

FIG. 2 shows a magnetization path 01 of an arrangement according to the invention. The magnetization path runs on a cylindrical lateral-face-shaped surface 02 of the hollow shaft. The magnetization path 01 is closed and has, in the shown general embodiment, an irregular shape. Because the magnetization path 01 is arranged on the cylindrical lateral-face-shaped surface 02 of the hollow shaft and is closed, it has different orientations relative to an axis of the hollow shaft along its profile.

Figure 3:
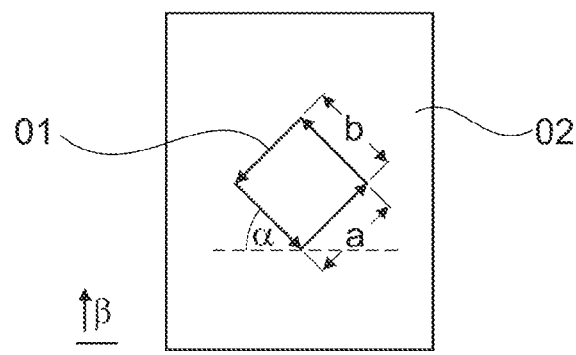
FIG. 3: a magnetization path of a first preferred embodiment of the arrangement according to the invention.

FIG. 3 shows a magnetization path 01 of a first preferred embodiment of the arrangement according to the invention. In the unrolled representation, the magnetization path has the shape of a square. The square is inclined by 45° relative to the axis of the hollow shaft. This inclination angle $\alpha$, however, could also have a different magnitude. The edge lengths a and b can also have a different size, so that the magnetization path has, in the unrolled representation, the shape of a rectangle.

Figure 4:
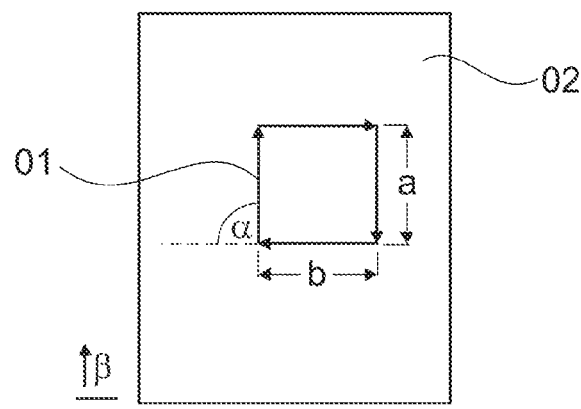
FIG. 4: a magnetization path of a second preferred embodiment of the arrangement according to the invention.

FIG. 4 shows a magnetization path 01 of a second preferred embodiment of the arrangement according to the invention. In the unrolled representation, the magnetization path has the shape of a square. The square is oriented parallel to the axis of the hollow shaft. The square, however, could also be inclined by an inclination angle $\alpha$ relative to the axis. The edge lengths a and b could also have different magnitudes, so that the magnetization path 01 has, in the unrolled representation, the shape of a rectangle.

Figure 5:
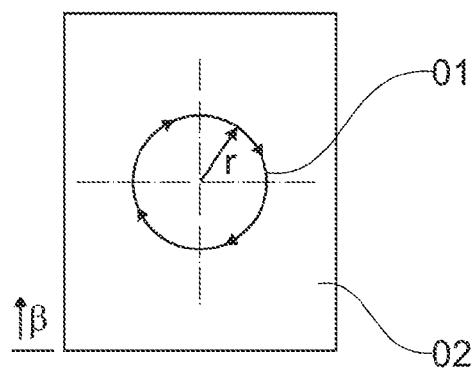
FIG. 5: a magnetization path of a third preferred embodiment of the arrangement according to the invention.

FIG. 5 shows a magnetization path 01 of a third preferred embodiment of the arrangement according to the invention. In the unrolled representation, the magnetization path 01 has the shape of a circle. The magnetization could also be oriented differently.

Figure 6:
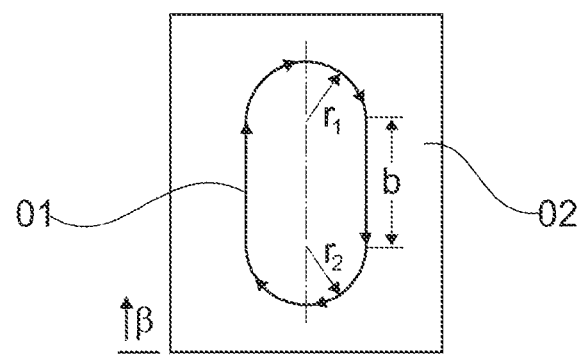
FIG. 6: a magnetization path of a fourth preferred embodiment of the arrangement according to the invention.

FIG. 6 shows a magnetization path 01 of a fourth preferred embodiment of the arrangement according to the invention. In the unrolled representation, the magnetization path 01 has the shape of a superellipse-like oval. The magnetization could also be oriented differently. The radii $r_1$ and $r_2$ can have different magnitudes and are variable. The edge length b is also variable.

Figure 7:
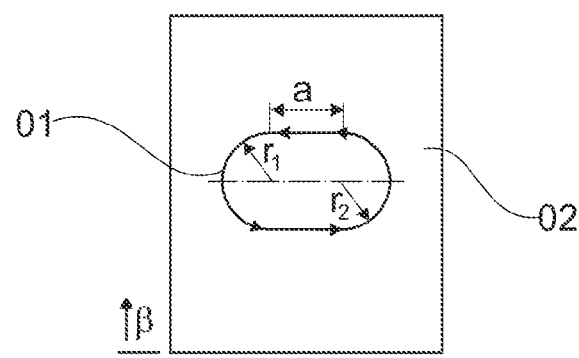
FIG. 7: a magnetization path of a fifth preferred embodiment of the arrangement according to the invention.

FIG. 7 shows a magnetization path 01 of a fifth preferred embodiment of the arrangement according to the invention. In the unrolled representation, the magnetization path 01 has the shape of a superellipse-like oval. The magnetization can be oriented differently. The radii $r_1$ can have different magnitudes and are variable. The edge length a is also variable.

FIG. 8 to FIG. 13 show magnetization paths 01 of preferred embodiments of the arrangement according to the invention, wherein the magnetization paths 01 are arranged not completely on the cylindrical lateral-face-shaped surface 02 of the hollow shaft. Therefore, FIG. 8 to FIG. 11 each show only a portion of each magnetization path 01, namely the part that is arranged on the cylindrical lateral-face-shaped surface 02 of the hollow shaft. This part has, in the shown embodiments in the unrolled representation, the shape of a straight section.

The embodiments shown in FIG. 8 to FIG. 13 each have two of the permanent magnetizations, wherein the two permanent magnetizations stand symbolically for multiple permanent magnetizations.

The magnetization paths 01 of the embodiments shown in FIG. 8 to FIG. 13 are each in a plane and have the shape of a superellipse-like oval. The ovals have a narrow construction, so that they each have two longitudinal sides. One of the two longitudinal sides runs on the surface 02 of the hollow shaft. The other of the two longitudinal sides runs under the longitudinal side located on the surface 02 in the interior of the material of the hollow shaft offset in the direction of the axis of the hollow shaft. Consequently, a perpendicular from the center point of each superellipse-like oval lies on the axis of the hollow shaft in the plane of each superellipse-like oval.

Figure 8:
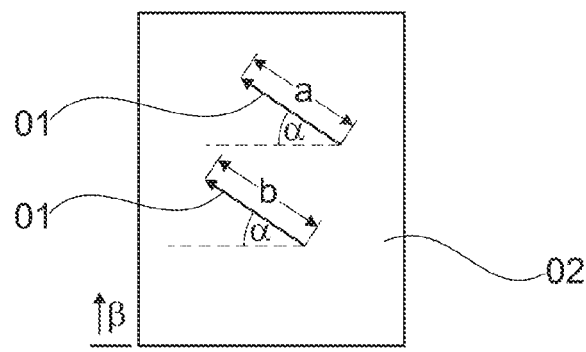
FIG. 8: magnetization paths of a sixth preferred embodiment of the arrangement according to the invention.

FIG. 8 shows two of the magnetization paths 01 of a sixth preferred embodiment of the arrangement according to the invention. In this embodiment, the planes encompassing the magnetization paths 01 or the superellipse-like ovals are each inclined at an angle α relative to the axis (not shown) of the hollow shaft. The angle α is variable. The edge lengths a and b of the longitudinal sides are likewise variable.

Figure 9:
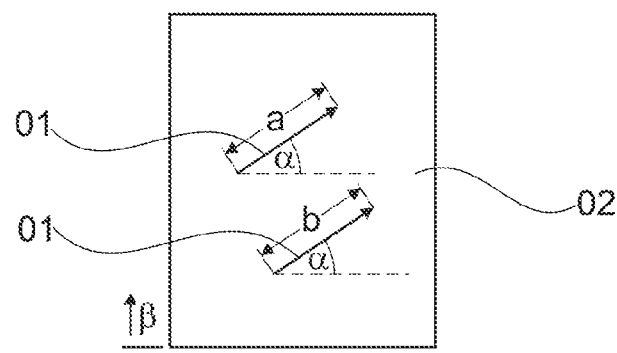
FIG. 9: magnetization paths of a seventh preferred embodiment of the arrangement according to the invention.

FIG. 9 shows two of the magnetization paths 01 of a seventh preferred embodiment of the arrangement according to the invention. In this embodiment, the planes encompassing the magnetization paths 01 or the superellipse-like ovals are each inclined at an angle α relative to the axis (not shown) of the hollow shaft. The angle α is variable. The edge lengths a and b of the longitudinal sides are likewise variable.

Figure 10:
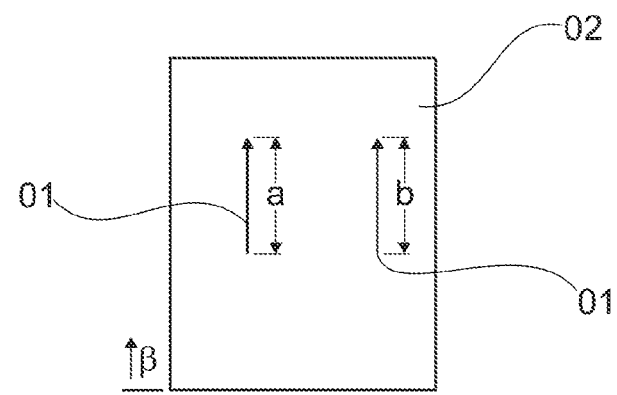
FIG. 10: magnetization paths of an eighth preferred embodiment of the arrangement according to the invention.

FIG. 10 shows two of the magnetization paths 01 of an eighth preferred embodiment of the arrangement according to the invention. In this embodiment, the planes encompassing the magnetization paths 01 or the superellipse-like ovals are each arranged perpendicular relative to the axis (not shown) of the hollow shaft. The edge lengths a and b of the longitudinal sides are variable.

Figure 11:
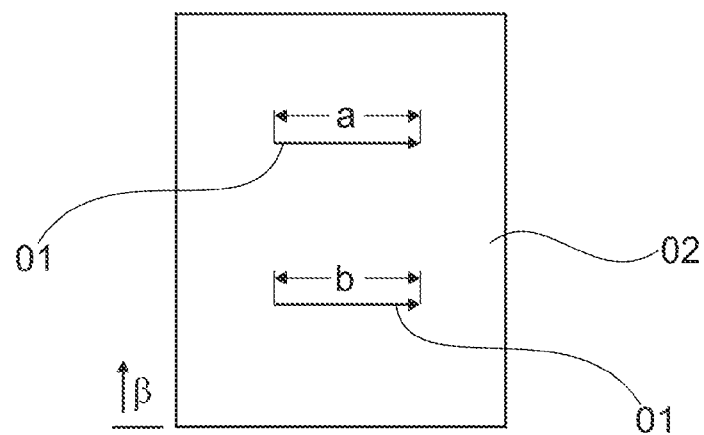
FIG. 11: magnetization paths of a ninth preferred embodiment of the arrangement according to the invention.

FIG. 11 shows two of the magnetization paths 01 of a ninth preferred embodiment of the arrangement according to the invention. In this embodiment, the planes encompassing the magnetization paths 01 or the superellipse-like ovals each also encompass the axis (not shown) of the hollow shaft. The edge lengths a and b of the longitudinal sides are variable.

Figure 12:
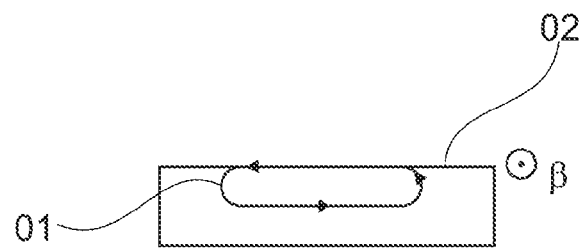
FIG. 12: one of the magnetization paths shown in FIG. 8 in another view.

FIG. 12 shows one of the magnetization paths 01 shown in FIG. 8 in another view. The plane of this view encompasses the axis (not shown) of the hollow shaft, so that the hollow shaft and its cylindrical lateral-face-shaped surface 02 are sectioned. In this view, the two longitudinal sides of the superellipse-like oval of the magnetization path 01 are shown. The longitudinal side running underneath the cylindrical lateral-face-shaped surface 02 can be arranged at different depths in the interior of the material of the hollow shaft.

Figure 13:
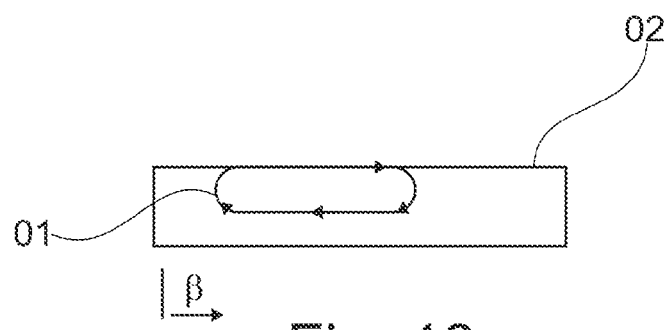
FIG. 13: one of the magnetization paths shown in FIG. 8 in another view.

FIG. 13 shows one of the magnetization paths 01 shown in FIG. 8 in another view. The plane of this view is arranged perpendicular to the axis (not shown) of the hollow shaft, so that the hollow shaft and its cylindrical lateral-face-shaped surface 02 are sectioned. In this view, the two longitudinal sides of the superellipse-like oval of the magnetization path 01 are shown in turn. The longitudinal side running underneath the cylindrical lateral-face-shaped surface 02 can be arranged at different depths in the interior of the material of the hollow shaft.

LIST OF REFERENCE NUMBERS

01 Magnetization path
02 Cylindrical lateral-face-shaped surface

The invention claimed is:

1. An arrangement for measuring at least one of a force or a torque on a machine element extending along an axis, the arrangement comprising the machine element having a permanent magnetization that extends along a closed magnetization path, at least one magnetic field sensor constructed for measuring at least one component of a magnetic field generated by the permanent magnetization and by the at least one of the force or the torque, wherein an alignment of the permanent magnetization relative to the axis changes along the magnetization path, and the axis of the machine element is arranged outside of the closed magnetization path.

2. The arrangement according to claim 1, wherein the permanent magnetization is magnetically neutral outside of the machine element in a state of the machine element unloaded by the at least one of the force or by the torque.

3. The arrangement according to claim 1, wherein the permanent magnetization is formed by a magnetized, three-dimensional partial area of the machine element that has a closed cord form, and the closed magnetization path represents a center axis of the cord.

4. The arrangement according to claim 1, wherein the closed magnetization path is formed by a three-dimensional curve that is closed in sp ace.

5. The arrangement according to claim 1, wherein the closed magnetization path has a parallelogram shape or a superellipse shape, and the parallelogram shape or the superellipse shape is projected onto the surface of the machine element.

6. The arrangement according to claim 5, wherein sides of the parallelogram shape or axes of the superellipse shape are inclined relative to the axis of the machine element.

7. The arrangement according to claim 1, wherein the closed magnetization path extends in a plane, and a perpendicular from a center point of a surface spanned by the closed magnetization path lies on the axis in the plane.

8. The arrangement according to claim 7, wherein the closed magnetization path has two longitudinal sides, and one of the two longitudinal sides runs on the surface of the machine element and the other of the two longitudinal sides runs below the surface of the machine element.

9. The arrangement according to claim 1, wherein the machine element has multiple permanent magnetizations.

10. The arrangement according to claim 9, wherein the multiple permanent magnetizations have identical constructions and are oriented in a same way relative to the axis of the machine element.

11. An arrangement for measuring at least one of a force or a torque on a machine element extending along an axis, the arrangement comprising the machine element having a permanent magnetization that extends along a closed magnetization path, at least one magnetic field sensor constructed for measuring at least one component of a magnetic field generated by the permanent magnetization and by the at least one of the force or the torque, wherein an alignment of the permanent magnetization relative to the axis changes along the magnetization path, the closed magnetization path is formed by a three-dimensional curve that is closed in space, and the axis of the machine element is arranged outside of the closed magnetization path.

12. The arrangement according to claim 11, wherein machine element is a circular cylinder.

13. The arrangement according to claim 11, wherein the permanent magnetization is formed by a magnetized, three-dimensional partial area of the machine element that has a closed cord form, and the closed magnetization path represents a center axis of the cord.

14. The arrangement according to claim 11, wherein the closed magnetization path is formed by a three-dimensional curve that is closed in space.

15. The arrangement according to claim 11, wherein the closed magnetization path has a parallelogram shape or a superellipse shape, and the parallelogram shape or the superellipse shape is projected onto the surface of the machine element.

16. The arrangement according to claim 15, wherein sides of the parallelogram shape or axes of the superellipse shape are inclined relative to the axis of the machine element.

17. The arrangement according to claim 11, wherein the closed magnetization path extends in a plane, and a perpendicular from a center point of a surface spanned by the closed magnetization path lies on the axis in the plane.

18. The arrangement according to claim 17, wherein the closed magnetization path has two longitudinal sides, and one of the two longitudinal sides runs on the surface of the machine element and the other of the two longitudinal sides runs below the surface of the machine element.

19. The arrangement according to claim 1, wherein the machine element has multiple permanent magnetizations.

20. The arrangement according to claim 19, wherein the multiple permanent magnetizations have identical constructions and are oriented in a same way relative to the axis of the machine element.

* * * * *